United States Patent [19]

Slavik

[11] Patent Number: 5,163,792
[45] Date of Patent: Nov. 17, 1992

[54] DRILL GUIDE CLAMP APPARATUS

[76] Inventor: Donald E. Slavik, Rte. 1 Box 113A, Garfield, Minn. 56332

[21] Appl. No.: 740,714

[22] Filed: Aug. 6, 1991

[51] Int. Cl.⁵ .............................................. B23B 47/28
[52] U.S. Cl. ...................................... 408/97; 408/104
[58] Field of Search ............... 408/103, 104, 105, 108, 408/72 B, 97, 115 R

[56] References Cited

U.S. PATENT DOCUMENTS

| | | | |
|---|---|---|---|
| 2,453,482 | 11/1948 | Woolson | 408/97 |
| 2,674,907 | 4/1954 | Zoll | 408/97 |
| 3,386,318 | 6/1968 | Pekarcik et al. | 408/97 |
| 4,027,992 | 6/1977 | Mackey Jr. et al. | 408/97 |
| 4,601,618 | 7/1986 | McEldowney | 408/97 |
| 4,614,464 | 9/1986 | Christensen | 408/104 |

FOREIGN PATENT DOCUMENTS 586363  3/1947  United Kingdom ................. 408/97

*Primary Examiner*—Daniel W. Howell
*Attorney, Agent, or Firm*—Leon Gilden

[57] ABSTRACT

A clamp structure mounts a workpiece between an underlying saddle plate and an uppermost bushing head, wherein the bushing head includes a slidably received guide bushing directed therewithin in coaxially oriented alignment with a saddle bore directed within the saddle to provide for alignment of drilling directed through the workpiece. The invention further includes the bushing head and saddle clamp arranged and mounted on pivoting jaw structure arranged for clamping of the workpiece therebetween.

2 Claims, 5 Drawing Sheets

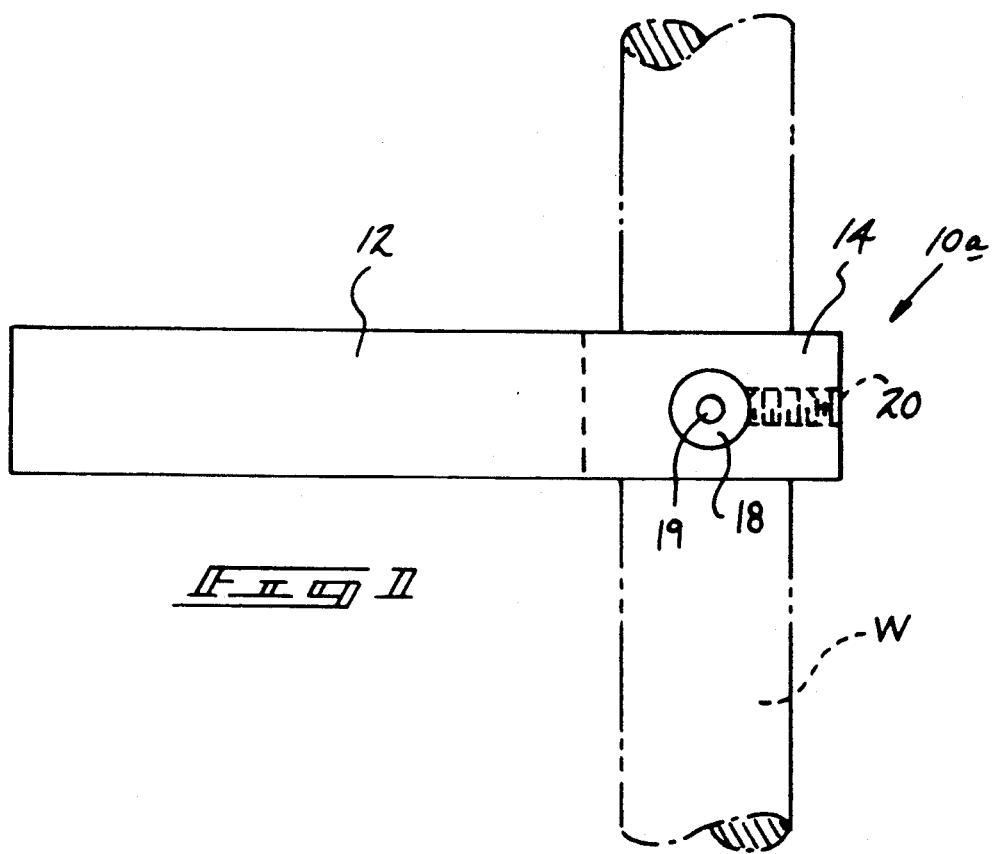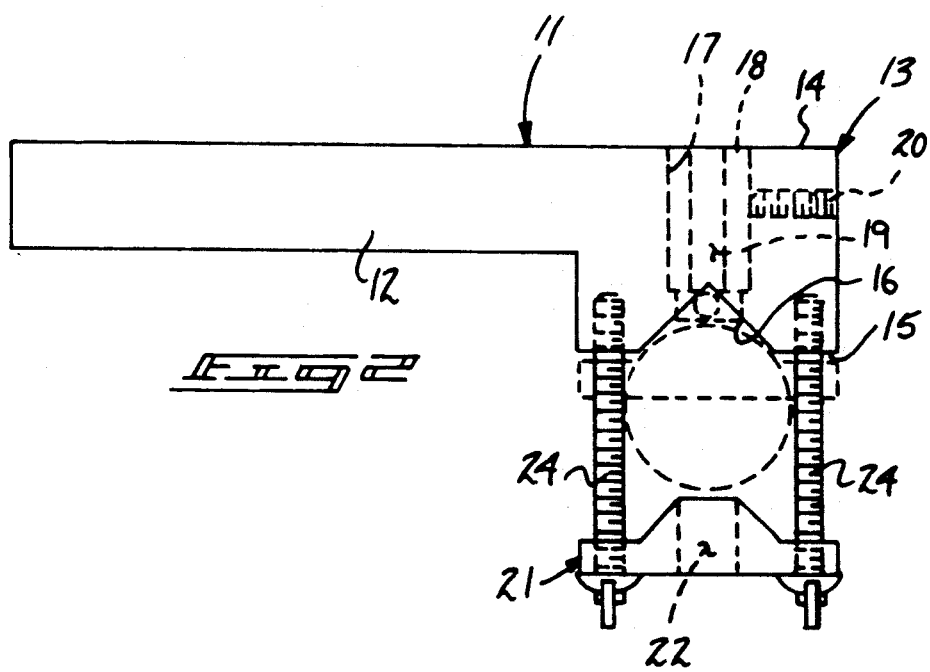

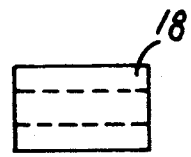
Fig. 7
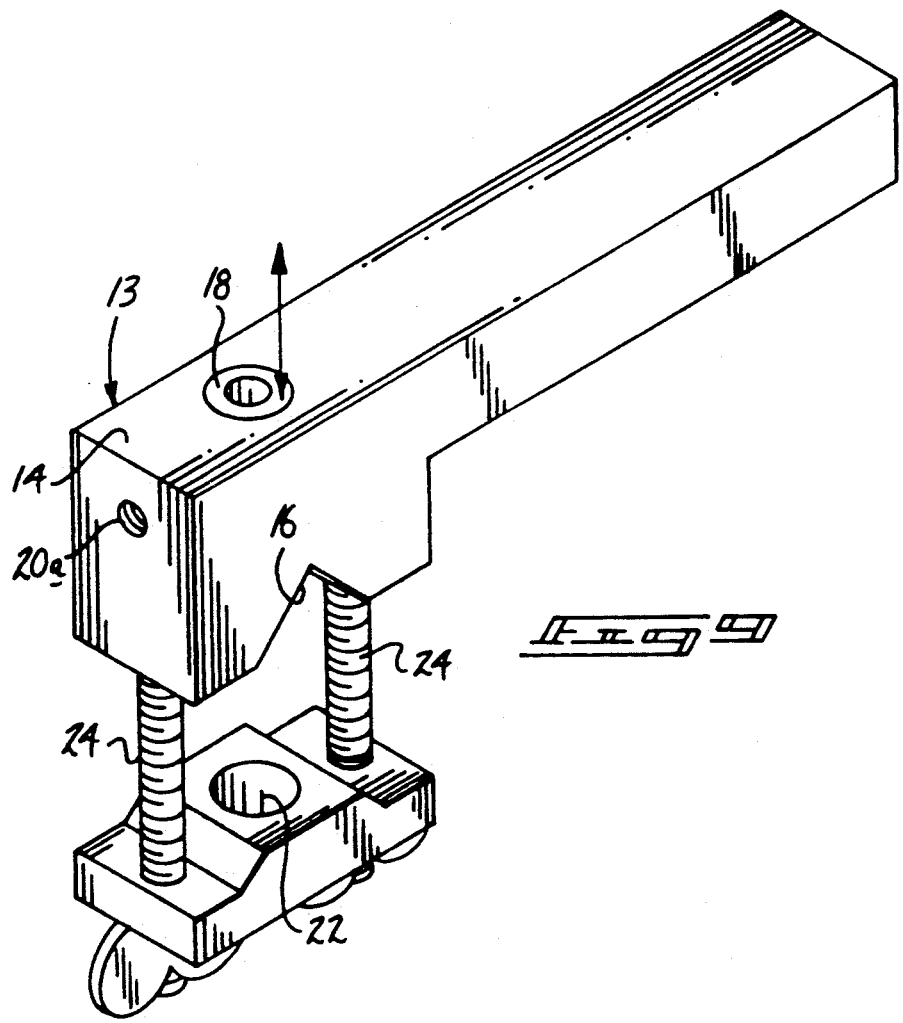
Fig. 8
Fig. 9

DRILL GUIDE CLAMP APPARATUS

BACKGROUND OF THE INVENTION

1. Field of the Invention

The field of invention relates to drill guide apparatus, and more particularly pertains to a new and improved drill guide clamp apparatus wherein the same is arranged for the simultaneous clamping and orientation of coaxially aligned bores for directing and guidance of a drill through bar or plate stock between the clamp structure.

2. Description of the Prior Art

Guides of various types for alignment of drills are utilized in the prior art to permit alignment of a workpiece relative to a guide structure to direct a bore through a radial center of the workpiece, as required. Examples of prior art guide structure is exemplified in U.S. Pat. No. 4,836,720 to Hadden wherein a drill guide includes an upper and lower structure utilizing alignment guides to position a workpiece or guidance of a drill.

U.S. Pat. No. 3,667,855 to Douglass, et al. sets forth a portable drill guide wherein a support table mounts a bore and a leg member aligns a drill bit relative to the bore to direct the drill into the bore and through an associated workpiece positioned therebetween.

U.S. Pat. No. 4,948,304 to Kobayashi sets forth a plate structure pivotally mounting a drill bit therethrough utilizing a driver mounted to the drill bit to direct the drill bit into an underlying workpiece.

U.S. Pat. No. 4,923,341 to Cameron sets forth a portable drill guide wherein an upper sleeve slidably mounts a support plate, and the support plate positions a drill bit relative to an underlying anvil.

As such, it may be appreciated that there continues to be a need for a new and improved drill guide clamp apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of drill guide apparatus now present in the prior art, the present invention provides a drill guide clamp apparatus wherein the same effects the simultaneous clamping of a workpiece in a drilling procedure. As such, the general purpose of the present invention, which will be described subsequently in greater detail, is to provide a new and improved drill guide clamp apparatus which has all the advantages of the prior art drill guide apparatus and none of the disadvantages.

To attain this, the present invention provides a clamp structure mounting a workpiece between an underlying saddle plate and an uppermost bushing head, wherein the bushing head includes a slidably received guide bushing directed therewithin in coaxially oriented alignment with a saddle bore directed within the saddle to provide for alignment of drilling directed through the workpiece. The invention further includes the bushing head and saddle clamp arranged and mounted on pivoting jaw structure arranged for clamping of the workpiece therebetween.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved drill guide clamp apparatus which has all the advantages of the prior art drill guide apparatus and none of the disadvantages.

It is another object of the present invention to provide a new and improved drill guide clamp apparatus which may be easily and efficiently manufactured and marketed.

It is a further object of the present invention to provide a new and improved drill guide clamp apparatus which is of a durable and reliable construction.

An even further object of the present invention is to provide a new and improved drill guide clamp apparatus which is susceptible of a low cost of manufacture with regard to both materials and labor, and which accordingly is then susceptible of low prices of sale to the consuming public, thereby making such drill guide clamp apparatus economically available to the buying public.

Still yet another object of the present invention is to provide a new and improved drill guide clamp apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of the instant invention.

FIG. 2 is an orthographic side view of the instant invention.

FIG. 7 is an orthographic view of the lock rod utilized to secure a guide bushing within the invention.

FIG. 8 is an orthographic side view of a typical guide bushing utilized by the invention.

FIG. 9 is an isometric illustration of the instant invention.

DESCRIPTION OF THE PREFERRED EMBODIMENT

Figure 3:
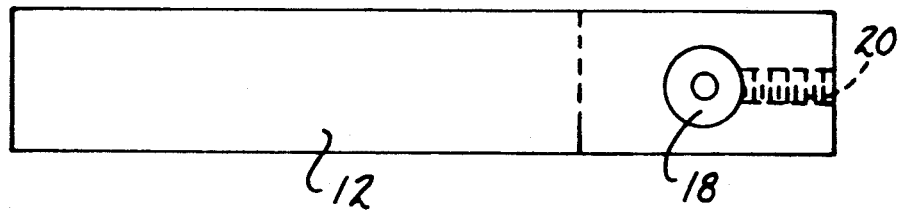
FIG. 3 is an orthographic top view of the elongate body structure.
Figure 4:
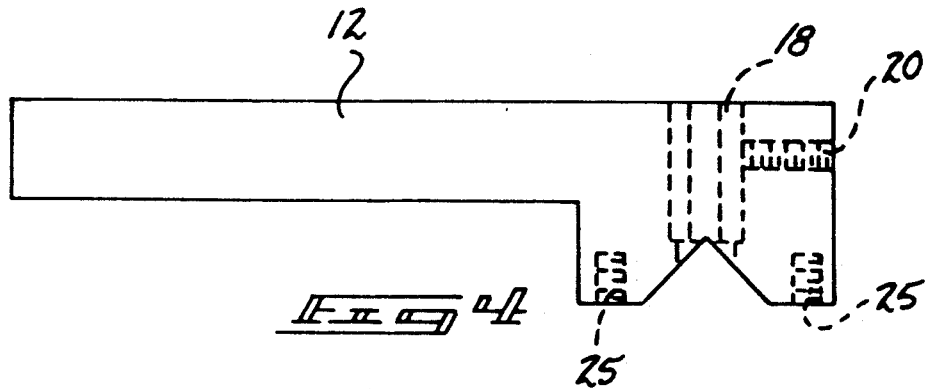
FIG. 4 is an orthographic side view of the body, as illustrated in FIG. 3.
Figure 5:
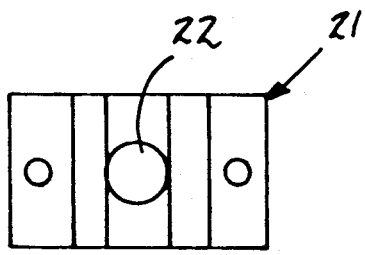
FIG. 5 is an orthographic top view of the saddle clamp structure utilized by the invention.
Figure 6:
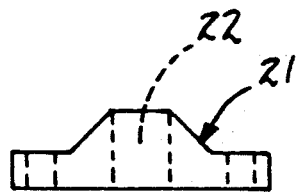
FIG. 6 is an orthographic side view of the saddle clamp, as illustrated in FIG. 5.

With reference now to the drawings, and in particular to FIGS. 1 to 14 thereof, a new and improved drill guide clamp apparatus embodying the principles and concepts of the present invention and generally designated by the reference numerals 10, 10a, and 10b will be described.

More specifically, the drill guide clamp apparatus 10 of the instant invention essentially comprises an elongated body 11 defined by a handle leg 12 fixedly mounted to a bushing head 13 integrally mounted to a forward end of the handle leg 12 defining a coplanar top wall 14 spaced from and parallel a bottom wall 15. A "V" shaped recess 16 is directed medially of the bottom wall 15 and is bisected by a sleeve receiving bore 17 orthogonally originating from the top wall 14 directed into the "V" shaped recess 16, wherein the sleeve receiving bore 17 includes a cylindrical guide sleeve 18 defined by a sleeve bore 19. The sleeve bore 19 is formed of a varying diameter utilizing a multiplicity of such sleeves 18, as illustrated in FIG. 8 for example, of a constant external diameter but of varying internal diameter to accommodate various drill bits of various sizes in a drilling procedure. A lock rod 20 orthogonally intersects the sleeve receiving bore 17 to lock the cylindrical sleeve 18 within the sleeve receiving bore 17, wherein the lock rod 20 is threadedly received within a lock rod internally threaded bore 20a.

A clamp saddle plate 21 is positioned below the bottom wall 15 and the "V" shaped recess 16 and includes a saddle plate projection 23 complementarily received within the "V" shaped recess 16 to permit projection of the saddle plate projection 23 into the recess 16 and accommodate workpieces of a lesser diameter than a defined depth of the "V" shaped recess 16. The saddle plate 21 includes a saddle plate bore 22 coaxially aligned with the sleeve receiving bore 17 and the sleeve bore 19. Clamp rods 24 are positioned in a parallel relationship to opposed sides of the saddle plate projection 23 and are mounted within internally threaded bores 25 (see FIG. 4) orthogonally directed into the bottom wall 15 of the bushing head 13. Fasteners mounted to lower terminal ends of each clamp rod 24 direct the saddle plate 21 towards the bottom wall 15 to clamp a workpiece "W".

Figure 10:
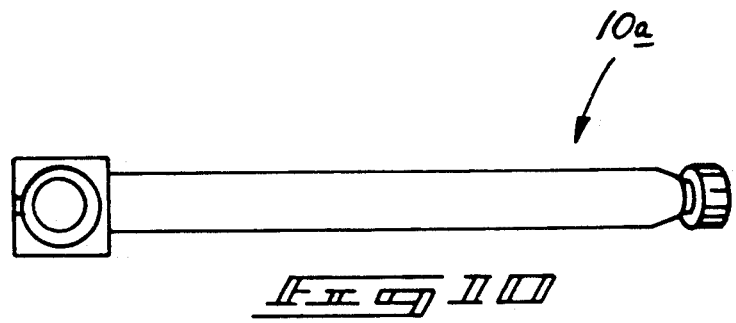
FIG. 10 is an orthographic top view of a modification of the invention.
Figure 11:
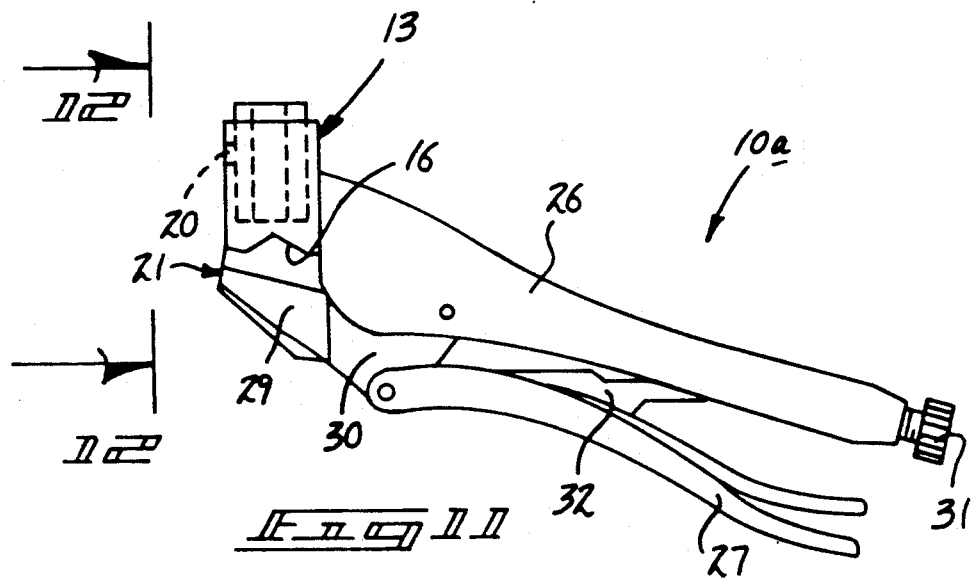
FIG. 11 is an orthographic side view of the invention, as illustrated in FIG. 10.
Figure 12:
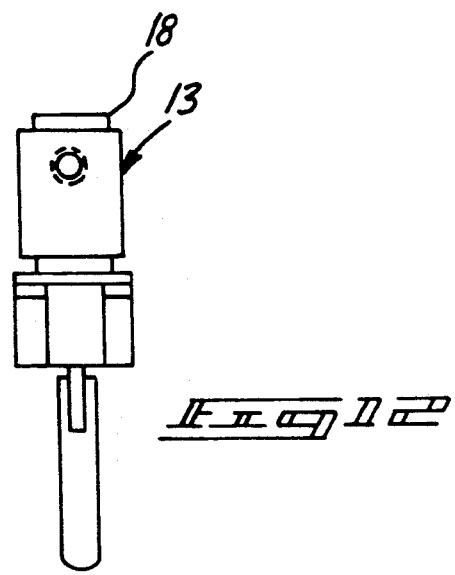
FIG. 12 is an orthographic view, taken along the lines 12—12 of FIG. 11 in the direction indicated by the arrows.

FIGS. 10-12 illustrate a modified apparatus 10a, including a fixed clamp leg 26 fixedly mounting the bushing head 13 at a forward terminal end thereof, with a pivoted clamp leg 27 pivotally mounted to a pivot jaw 30 pivotally mounted to the fixed clamp leg 26 and mounting a movable jaw 29 securing the saddle plate 21 to a top surface thereof to secure a workpiece between the saddle plate and the "V" shaped recess 16. A pivot link 32 cooperates with an adjusting screw 31 longitudinally directed into a rear terminal end of the fixed clamp leg 26 to provide clamping adjustment of the movable jaw 29 relative to the bushing head 13 and the "V" shaped recess 16.

Figure 13:
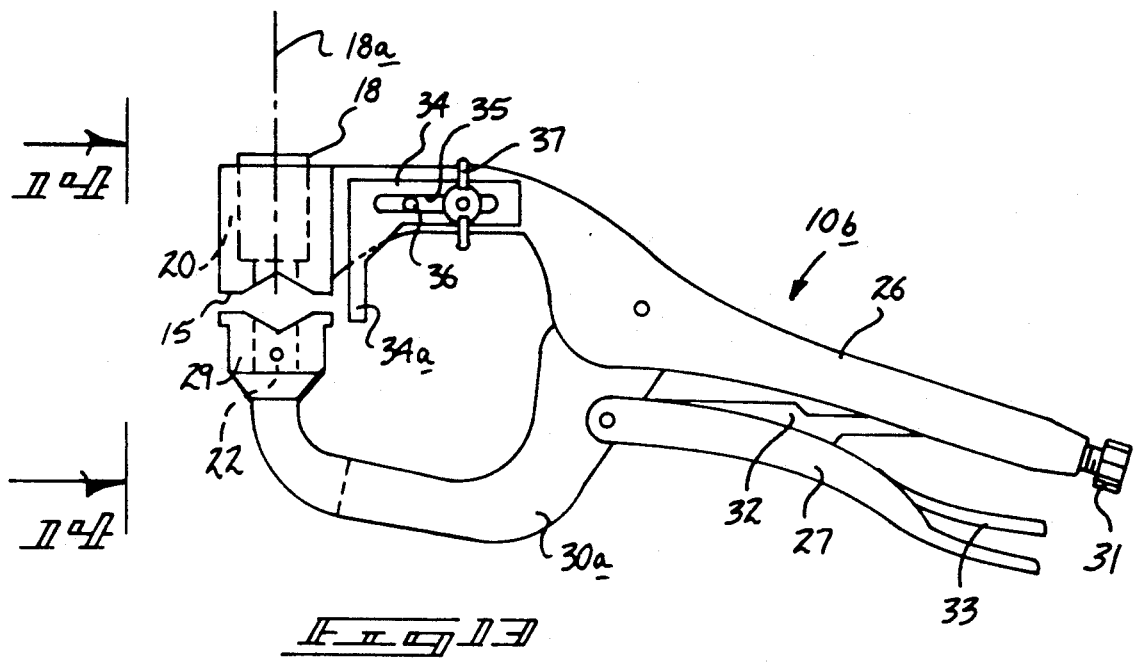
FIG. 13 is an orthographic side view of a further modification of the invention.
Figure 14:
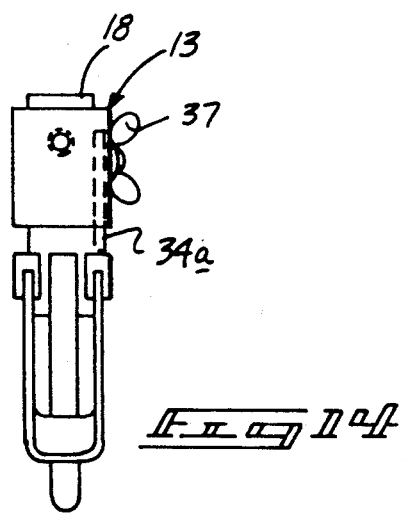
FIG. 14 is an orthographic view, taken along the lines 14—14 of FIG. 13 in the direction indicated by the arrows.

FIGS. 13 and 14 illustrate a further modified clamp apparatus 10a utilizing a modified pivot jaw 30a of a generally "U" shaped configuration to accommodate bar stock and provide clearance therefore, wherein an abutment plate body 34 is slidably mounted in orthogonal alignment relative to the axis defined by the cylindrical sleeve 18 and includes an abutment plate leg 34a orthogonally oriented relative to the abutment plate body 34, wherein the leg is positioned below the bottom wall 15 of the bushing head 13 providing for abutment surface of a workpiece slid along the bottom wall 15. The abutment plate body 34 includes an elongate slot 35 orthogonally oriented to the aforenoted axis 18a, with an alignment pin 36 orthogonally mounted to a side of the fixed clamp leg 26 adjacent the bushing head 13. A lock fastener 37 positioned rearwardly of the alignment pin 36 effects locking of the abutment plate body 34 in a spaced relationship relative to the bushing head 13. Further, the release lever 33 cooperates relative to the fixed clamp leg 26 and the pivoted clamp leg 27, as well as the pivot link 32 to provide subsequent release of the movable jaw 29 relative to the bushing head 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A drill guide clamp apparatus, comprising, an elongate body, the body including a fixed clamp leg fixedly and orthogonally mounting a bushing head at a forward terminal end of the clamp leg, and the bushing head including a top wall spaced from and parallel a bottom wall, and a "V" shaped recess directed into the bottom wall medially thereof, and a sleeve receiving bore orthogonally directed through the top wall bisecting the "V" shaped recess, the sleeve receiving bore slidably receiving a cylindrical guide sleeve therethrough, the sleeve receiving bore defined by an axis, with the cylindrical guide sleeve coaxially aligned relative to the axis, and a sleeve bore directed coaxially through the guide sleeve, and a movable jaw positioned below the bottom wall, the movable jaw and the bottom wall arranged for securing a workpiece therebetween, and the movable jaw includes a medially positioned projection complementarily configured relative to the "V" shaped recess, wherein the projection includes a clamp bore directed therethrough, wherein the clamp bore is coaxially aligned relative to the axis, and including a lock rod threadedly received within an internally threaded bore, the internally threaded bore orthogonally intersecting the sleeve receiving bore, wherein the lock rod is arranged for selective locking of the guide sleeve within the sleeve receiving bore, and the fixed clamp leg cooperates with a pivoted clamp leg, the pivoted clamp leg mounts the clamp plate at a forward terminal end thereof, and the pivoted clamp leg and the fixed clamp leg cooperative to clamp the workpiece between the projection and the "V" shaped recess.

2. An apparatus as set forth in claim 1 including an abutment plate body slidably mounted to a side of the fixed clamp leg, wherein the abutment plate body includes a slot, the slot orthogonally oriented relative to the axis of the sleeve receiving bore, and an alignment pin fixedly and orthogonally mounted to the side of the fixed clamp leg projecting through the slot spaced from a fastener, wherein the fastener is directed through the slot for selective clamping of the abutment plate body relative to the fixed clamp leg, and the abutment plate body includes an abutment plate leg orthogonally and integrally mounted to a forward terminal end of the abutment plate body, wherein the abutment plate leg extends below the bottom wall of the bushing head to provide an abutment surface for the workpiece directed beyond the bottom wall into confrontation with the abutment leg.

* * * * *